United States Patent
Kantajaraniti

(10) Patent No.: US 9,475,460 B2
(45) Date of Patent: Oct. 25, 2016

(54) GEAR LEVER LOCKING DEVICE

(71) Applicants: Kamol Kantajaraniti, Bangkok (TH);
Suwat Petcharapirat,
Prachuapkhinkhan (TH)

(72) Inventor: Kamol Kantajaraniti, Bangkok (TH)

(73) Assignees: Kamol Kantajaraniti, Bangkok (TH);
Suwat Petcharapirat,
Prachuapkhinkhan (TH)

(*) Notice: Subject to any disclaimer, the term of this patent is extended or adjusted under 35 U.S.C. 154(b) by 93 days.

(21) Appl. No.: 14/378,900

(22) PCT Filed: Feb. 22, 2013

(86) PCT No.: PCT/TH2013/000009
§ 371 (c)(1),
(2) Date: Aug. 14, 2014

(87) PCT Pub. No.: WO2013/147717
PCT Pub. Date: Oct. 3, 2013

(65) Prior Publication Data
US 2015/0052956 A1   Feb. 26, 2015

(30) Foreign Application Priority Data
Feb. 24, 2012   (TH) .................. 1201000758

(51) Int. Cl.
*B60R 25/06*  (2006.01)
*B60R 25/00*  (2013.01)
(Continued)

(52) U.S. Cl.
CPC ......... *B60R 25/066* (2013.01); *B60R 25/007* (2013.01); *B60R 25/086* (2013.01); *E05B 77/00* (2013.01); *Y10T 70/402* (2015.04)

(58) Field of Classification Search
CPC ... B60R 25/00; B60R 25/007; B60R 25/008; B60R 25/01; B60R 25/04; B60R 25/06; B60R 25/066; B60R 25/086
See application file for complete search history.

(56) References Cited

U.S. PATENT DOCUMENTS 1,262,349 A    4/1918  Jensen
1,362,377 A *  12/1920 Weidner ............... B60R 25/066
                                              70/203

(Continued)

FOREIGN PATENT DOCUMENTS

DE    1208641    1/1966
FR    2737160    1/1997

(Continued)

OTHER PUBLICATIONS

International Search Report and Written Opinion dated Mar. 31, 2014 in International Application No. PCT/TH2013/000009.

(Continued)

*Primary Examiner* — Christopher Boswell
(74) *Attorney, Agent, or Firm* — Kim Winston LLP

(57) ABSTRACT

A gear locking lever device having a gear lever locking device mounting base and a gear lever locking member mounted and attached to the gear lever locking device mounting base is provided. The gear lever locking member includes a base plate located above the gear lever locking device mounting base. The lateral side of the base plate is provided with engaging leg extending laterally toward both sides. An intermediate portion of the base plate is provided with a pin engaging hole. A lower portion of the base plate is provided with a ball bearing pocket with a ball bearing mounted inside the ball bearing pocket.

23 Claims, 12 Drawing Sheets

(51) Int. Cl.
  *B60R 25/08* (2006.01)
  *E05B 77/00* (2014.01)

(56) References Cited

U.S. PATENT DOCUMENTS

| | | | |
|---|---|---|---|
| 3,431,755 A | 3/1969 | Eisenman | |
| 4,077,276 A * | 3/1978 | Knox, Jr. | B60K 17/344 |
| | | | 70/203 |
| 4,835,999 A * | 6/1989 | Chant | B60R 25/008 |
| | | | 70/199 |
| 5,251,446 A | 10/1993 | Mori et al. | |
| 5,431,244 A | 7/1995 | Possobom | |
| 5,444,999 A * | 8/1995 | Hsiao | B60R 25/066 |
| | | | 70/202 |
| 5,555,755 A * | 9/1996 | Padrin | B60R 25/066 |
| | | | 70/202 |
| 5,570,600 A * | 11/1996 | Hua | B60R 25/066 |
| | | | 70/203 |
| 5,635,901 A | 6/1997 | Weinblatt | |
| 5,778,710 A * | 7/1998 | Hu | B60R 25/066 |
| | | | 70/192 |
| 5,784,907 A * | 7/1998 | Hu | B60R 25/066 |
| | | | 248/552 |
| 6,059,687 A | 5/2000 | Durieux et al. | |
| 6,547,696 B2 * | 4/2003 | Syamoto | B60R 25/063 |
| | | | 477/99 |
| 6,703,721 B1 | 3/2004 | Kito | |
| 8,773,252 B2 * | 7/2014 | Kantajaraniti | B60R 25/066 |
| | | | 340/426.11 |
| 2002/0066296 A1 | 6/2002 | Lee | |
| 2005/0005657 A1 | 1/2005 | Jenkyns | |
| 2008/0045381 A1 | 2/2008 | Vermeersch et al. | |
| 2009/0151412 A1 | 6/2009 | Chung et al. | |
| 2011/0064224 A1 | 3/2011 | Rebuli | |

FOREIGN PATENT DOCUMENTS

| | | |
|---|---|---|
| WO | 0114178 A1 | 3/2001 |
| WO | 2010110757 A1 | 9/2010 |
| WO | 2011068484 A1 | 6/2011 |
| WO | 2011087463 A2 | 7/2011 |
| WO | 2013147715 A2 | 10/2013 |

OTHER PUBLICATIONS

International Search Report and Written Opinion dated Mar. 17, 2014 in International Application No. PCT/TH2013/000001.

* cited by examiner

GEAR LEVER LOCKING DEVICE

CROSS-REFERENCE TO RELATED APPLICATION

This application is a U.S. National Phase Application under 35 U.S.C. §371 of International Application No. PCT/TH2013/000009 filed Feb. 22, 2013 which claims priority to Thailand Application No. 1201000758 filed Feb. 24, 2012, the disclosures of which are hereby incorporated by reference in their entirety.

BACKGROUND OF THE INVENTION

The present invention relates to a gear lever locking device.

A gear lever locking device is a device mounted to the structure of an automobile for locking the position of a gear lever. Conventional gear lever locking devices have a gear lever lock loop provided to lock the gear lever locking device. The gear lever lock loop can be unlocked by an unlocking key system. However, such gear lever locking device has some drawbacks in that it is installed outside a gear lever panel. Therefore, the appearance of the gear lever locking device mounted to the vehicle is poor, vulnerable, or inconvenient in operation. It is desirable that such gear lever locking devices be permanently installed at about a lateral side of the gear lever since users often feel that such devices interfere with the automobile's steering capability while driving. With respect to releasable devices, such devices have to be placed in a position that will not interfere with the driver while driving after being removed or disengaged and is thus very inconvenient. As such, a need still exists for a gear lever locking device that can address the abovementioned problems. Such needs are addressed by a gear lever locking device in accordance with the present invention.

SUMMARY OF THE INVENTION

In accordance with a preferred embodiment, the present invention provides a gear lever locking device that includes a gear lever locking device mounting base, a gear lever locking member and a locking mechanism. The gear lever locking member is pivotally attached to the gear lever locking device mounting base. The locking mechanism is operatively connected to the gear lever locking member and includes a key unit and a first locking pin. The key unit is moveable between a first position for locking the locking mechanism and a second position for unlocking the locking mechanism. The first locking pin is operatively connected to the key unit. The first locking pin is moveable between a locking position for locking the gear lever locking member in a locked position for inhibiting operational movement of a gear lever and an unlocking position for allowing pivotal movement of the gear lever locking member. When the key unit is moved to the first position, the first locking pin is moved to the locking position and when the key unit is moved to the second position, the first locking pin is moved to the unlocking position.

In accordance with another preferred embodiment, the present invention provides a gear lever locking device that includes a gear lever locking device mounting base, a gear lever locking member and a locking mechanism. The gear lever locking member is pivotally attached to the gear lever locking device mounting base. The locking mechanism is operatively connected to the gear lever locking member and includes a key unit, a first locking pin and a locking pin driving member. The key unit is moveable between a first position for locking the locking mechanism and a second position for unlocking the locking mechanism. The first locking pin is operatively connected to the key unit. The first locking pin is moveable between a locking position for locking the gear lever locking member in a locked position for inhibiting operational movement of a gear lever and an unlocking position for allowing pivotal movement of the gear lever locking member. The locking pin driving member is configured as a quadrangular block having an inclined surface with an acute angle with respect to a horizontal. When the key unit is moved to the first position, the locking pin driving member slidingly engages the first locking pin to move the first locking pin to the locking position and when the key unit is moved to the second position, the first locking pin is biased to the unlocking position by the first biasing member.

In accordance with yet another preferred embodiment, the present invention provides a key unit that includes a hollow cylindrical key case and key core. The hollow cylindrical key case includes a groove for receiving a locking plate, and a fixing hole for attaching the key case to an inner sleeve. The key core is engaged with the key case. The key core includes a cylindrical rod body, and a plurality of the key code wedge receiving grooves each having a key code wedge received therein. Each key code wedge is configured as a quadrangular flat plate. The key core further includes a biasing member mounted to an inner part of each key code wedge receiving groove, and a locking shoulder about a lower end of the key core having an asymmetric cam rod.

A gear locking lever device comprises a gear lever locking device mounting base; a gear lever locking member mounted and attached to the gear lever locking device mounting base, wherein the gear lever locking member includes a base plate located above the gear lever locking device mounting base, wherein the lateral side of the base plate is provided with engaging leg extending laterally toward both sides, wherein the intermediate portion of the base plate is provided with a pin engaging hole, wherein the lower portion of the base plate is provided with a ball bearing pocket with ball bearing mounted inside the ball bearing pocket, wherein the upper portion of the base plate is provided with the gear lever lock loop and there is provided with the bolt inserted through the gear lever locking device mounting base and through the intermediate opening of the ball bearing in the upward direction to be engaged with the screw hole of the gear lever locking member to pivotally attach the gear lever locking member with the gear lever locking device mounting base.

A locking mechanism comprises a key unit mounting base connected along its entire lateral side to the first locking pin chamber, inside of the first locking pin chamber being provided with the first spring rod vertically mounted with the first locking pin inserted inside the first spring rod; a second locking pin unit mounted inside the key unit mounting base; a key unit being mounted on the upper portion of the second locking pin unit; a closure being attached to the upper outside portion of the key unit mounting base and the first locking pin chamber, the closure being a cylindrical rod with the threaded upper outside portion to be tightened to the inner threaded surface of the cap, the lateral side of the closure being a cover that covers the first locking pin chamber and attached to the first locking pin chamber by the tightening means; and a key of which the key code is identical with that of the key unit. In addition, the gear lever locking device also includes a screw cover used in covering various positions to prevent tampering with or removing the screws.

The present invention provides a gear lever locking device to be installed in a hidden manner inside the gear lever console of an automobile. It, therefore, prevents the interference with driving and yields good appearance allowing only the key unit to expose. In addition, there is installed a gear lever locking device without the need to punch through the vehicle frame. This is the attachment to the original screw of the automobile. Once the screw cover is mounted to prevent tampering with or removing the screws after the installation is completed, the periodical service of the gear lever can be done by removing the gear lever locking device followed by the maintenance work for the transmissions. This is different from the ordinary gear lever locking device which is installed by punching through the automobile frame in the permanent way and thus difficult for the maintenance service for the gear lever.

DETAILED DESCRIPTION OF THE INVENTION

Figure 1:
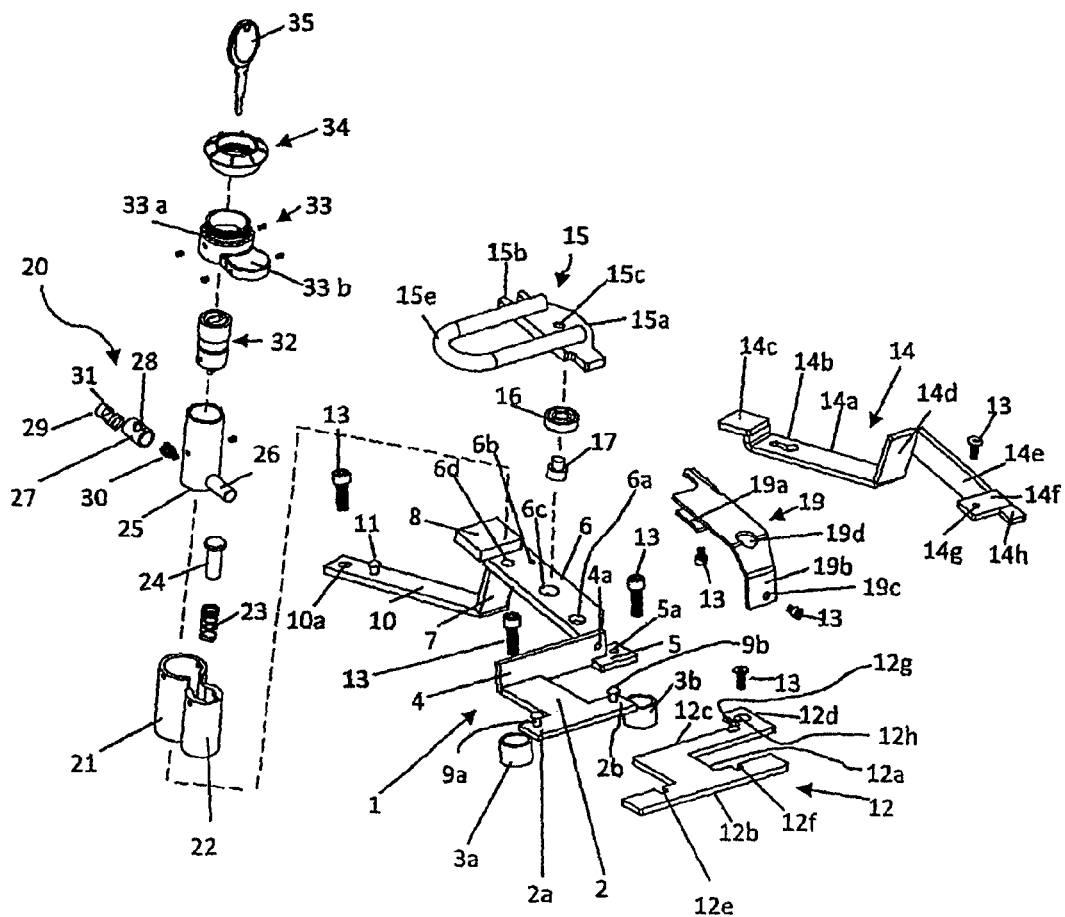
FIG. 1 shows an exploded view of a gear lever locking device according to a first preferred embodiment of the present invention.

Referring FIGS. 1 to 3, a gear lever locking device in accordance with a first preferred embodiment of the present invention is shown and includes a gear lever locking device mounting base 1 attached to the base frame below a gear lever console positioned in an original screw hole in a transmission chamber of a vehicle. The gear lever locking device mounting base 1 includes the first lateral body 2 having one lateral portion, both sides 2a, 2b extending therefrom for use as a placing base on a first screw holding base 3a and a second screw holding base 3b, respectively. The first screw holding base 3a and the second screw holding base 3b is attached to the base frame below the gear lever console by respective bolts 13. The upper side of the one lateral portion also includes a first pin 9a and a second pin 9b.

The other lateral portion of the first lateral body 2 is connected to a lower end portion in front of a vertical plate 4 which is a flat elongated plate. The other lower end portion of the vertical plate 4 is connected to a landing plate 5. One end of the vertical plate 4 is provided with a screw-hole 4a for receiving a fasting element such as a screw. The said end of the vertical plate 4, at its lower portion is connected to a landing plate 5 of which is also provided with a screw-hole 5a. The upper rear end of the vertical plate 4 positioned above the landing plate 5 is connected to one end of an intermediate body 6 which is a flat elongated plate. The other lower end portion of the intermediate body 6 is connected to a vertically inclined plate 7. The intermediate body 6 is connected to the vertical plate 4 in a downwardly inclined manner from the vertically inclined plate 7.

An upper end portion of the intermediate body 6 positioned above the vertically inclined plate 7 is connected to a landing seat 8. Both ends of the intermediate body 6 are provided with a first screw hole 6a and a second screw hole 6b. The intermediate portion of the intermediate body 6 is provided with a screw hole 6c. The lateral side near the landing seat 8 of the intermediate body 6 is provided with a locking pin slot 6d.

A lower end portion of the vertically inclined plate 7 is connected to one end of a second lateral body 10 which is a flat elongated plate. The other end of the second lateral body 10 is provided with a screw hole 10a to be connected to a frame base located below the gear lever console by a screw 13. The upper end portion of the other lateral side of the second lateral body 10 is provided with a fixing pin 11.

The upper end portion of the first lateral body 2 and the landing plate 5 of the gear lever locking device mounting base 1 is covered by a second screw cover plate 12. The second screw cover plate 12 includes an intermediate body portion 12a and a lateral body portion 12b. The size and shape of the lateral body portion 12b corresponds to the size and shape of the first lateral body 2 of the gear lever locking device mounting base 1 to allow appropriate placement on the first lateral body 2 of the gear lever locking device mounting base 1 and to cover the first screw holding base 3a and the second screw holding base 3b connected to the frame base below the gear lever console by a screw 13.

In sum, the mounting base includes the vertical plate 4, the first lateral body 2 connected to the vertical plate 4, the vertically inclined plate 7, the intermediate body 6 connected to the vertical plate and the vertically inclined plate, and the second lateral body connected to the vertically inclined plate 7. Further, the first lateral body 2 is connected to a lower end of the vertical plate 4, the first end of the intermediate body 6 is connected to an upper end of the vertical plate and a second end of the intermediate body opposite the first end is connected to an upper end of the vertically inclined plate 7, and the second lateral body 10 is connected to a lower end of the vertically inclined plate. Furthermore, the first lateral body 2 includes one lateral portion having first and second sides extending therefrom, the first screw holding base adjacent the first side for attaching to a base frame of the gear lever console of the gear lever, and the second screw holding base adjacent the second side for attaching to the base frame of the gear lever console of the gear lever.

The second screw cover plate 12 also includes lateral body 12c which extends along a front edge of the vertical plate 4 to the landing plate 5 of the gear lever locking device mounting base 1. The lateral body 12c extends from the lateral body portion 12b so as to be positioned above the landing plate 5 of the gear lever locking device mounting base 1. About an end of the lateral body 12 is an inwardly bending portion 12d which is configured to be positioned over the landing plate 5 of the gear lever locking device mounting base 1. The lateral body portion 12b includes an inner edge configured with a first notch 12e and a second notch 12f. The first and second notches 12e, 12f correspond in position with the first and second pins 9a, 9b of the first lateral body 2 of the gear lever locking device mounting base 1.

The interface or intersection between the lateral body 12c and the inwardly bending portion 12d is provided with a bolt head 12g to cover the screw 13 at the screw hole 19c of the first screw cover 19 which is aligned with the screw hole 4a of the vertical plate 4 of the gear lever locking device mounting base 1. The inwardly bending portion 12d also includes a screw hole 12h where the screw 13 is tightened thereto in a corresponding position with the screw engaging hole 5a of the landing plate 5 of the gear lever locking device mounting base 1.

The gear lever locking device also includes a third screw cover 14 having an intermediate body portion 14a which is a flat elongated plate. The size and shape of the intermediate body portion 14a corresponds to the size and shape of the second lateral body 10 of the gear lever locking device mounting base 1 so as to allow proper placement thereof on the second lateral body 10 of the gear lever locking device mounting base 1. The third screw cover 14 also includes a lateral portion having an engaging notch 14b configured to correspond in position with and engage a fixing pin 11 of the second lateral body 10 of the gear lever locking device mounting base 1. One lateral end of the intermediate body portion 14a is provided with an elevated portion 14c to cover a screw hole 10a of the of the second lateral body 10 of the gear lever locking device mounting base 1. That is, the elevated portion of the intermediate body portion 14a is configured to be positioned directly above the screw hole 10a of the second lateral body 10 when assembled thereto so as to cover the screw hole 10a.

The other lateral end of the intermediate body portion 14a is connected to a vertical portion 14d of which size and shape corresponds to the vertically inclined plate 7 of the gear lever locking device mounting base 1 in order to be appropriately coupleable thereto. At the upper end and lateral side of the vertical portion 14d is connected an abutting member 14e which extends in a downwardly inclined manner. The abutting member 14e is configured as an elongated plate that abuts the intermediate body 6 of the gear lever locking device mounting base 1. About an end opposite the end of the abutting member 14e connected to the vertical portion 14d is a lower supporting plate 14f which is configured to be positioned adjacent to the lower portion of the intermediate body 6 of the gear lever locking device mounting base 1 when assembled thereto. The lower supporting plate 14f includes a screw hole 14g in a position corresponding to the position of the first screw hole 6a of the intermediate body 6 of the gear lever locking device mounting base 1 for use in the connection thereto e.g., by the screw 13 being inserted through a hole 19d of the first screw cover plate 19. The lateral side of the lower supporting plate 14f includes a covering portion 14h for covering the screw hole 12h of the second screw cover plate 12.

The gear lever locking member 15 includes a base plate 15a and a gear lever hook 15e. The base plate 15a is mounted to the upper portion of the intermediate body 6 of the gear lever locking device mounting base 1. The base plate 15a includes an engaging leg 15b and a pin engaging hole 15c. The engaging leg 15c is situated about a lateral portion of the base plate 15a so as to correspond in position to the landing seat 8 of the gear lever locking device mounting base 1 when mounted to the intermediate body 6. The pin engaging hole 15c is located on the base plate 15a at a position corresponding to the position of screw hole 6c of the intermediate body 6. A lower portion of the base plate 15a is configured with a ball bearing pocket 15d for receiving a ball bearing 16, which is to be mounted within the ball bearing pocket 15d.

The gear lever hook 15e is configured to be engaged with the gear lever 18 for locking the gear lever so as to inhibit operational movement of the gear lever. For example, the gear lever lock loop can be configured to circumscribe the gear lever. The gear lever locking member 15 is attached to the intermediate body 6 through screw hole 6c of the intermediate body 6 of the gear lever locking device mounting base 1. That is, the gear lever locking member 15 is fastened to the intermediate body 6 via a bolt 17. One side of the bolt 17 is adjacent to the lower portion or lower surface of the intermediate body 6 while the other side of the bolt 17 is inserted through the screw hole 6c, the intermediate opening of the ball bearing 16 and the pin engaging hole 15c. When assembled together, the gear lever locking member 15 is pivotally attached to the intermediate body 6 of the gear lever locking device mounting base 1 which allows the gear lever locking member 15 to pivot and thereby facilitate the smooth shifting/operation of the gear lever 18. In other words, the base plate includes a ball bearing for pivotally mounting to the gear lever locking device mounting base.

The upper portion of the gear lever locking member 15 is covered with a first screw cover plate 19. The first screw cover plate 19 is an elongated downwardly bent plate as best shown in FIG. 1. A lower portion of one end of the first screw cover plate 19 is provided with a fixing portion 19a with a screw hole that corresponds in position with the second screw hole 6b of the intermediate body 6 in order to permit fastening with a screw 13. As well, the other end of the first screw cover plate 19 opposite the lower portion is provided with a downwardly bent portion 19b with a screw hole 19c aligned with the screw hole 4a of the vertical plate 4 to permit fastening with a screw 13.

The gear lever locking device of the present invention further includes a locking mechanism 20. The locking mechanism 20 includes a key system mounting base 21 and a first locking pin chamber 22 connected to and extending from a lateral side of the key system mounting base 21, as best shown in FIG. 1. The key system mounting base 21 includes a lateral side open to or connected thoroughly to a lateral side of the first locking pin chamber 22. The key system mounting base 21 and the first locking pin chamber 22 are each substantially configured to have an open-ended hollow cylindrical shape. The lateral side along the height between the key system mounting base 21 and the first locking pin chamber 22 is open. The key system mounting base 21 is mounted on the landing seat 8 of the gear lever locking device mounting base 1. The first locking chamber 22 is mounted onto the engaging leg 15b of the gear lever locking member 15. A spring rod 23 (i.e., a first biasing member) is vertically housed within the first locking pin chamber 22. A first locking pin 24 is further vertically housed within the first locking pin chamber 22 situated such that the first spring rod 23 circumscribes the first locking pin 24 and biases the first locking pin 24 in an upward direction. An inner sleeve 25 is mounted and housed within the key system mounting base 21.

In sum, the locking mechanism includes the key system mounting base 21 for housing the key unit and the first locking pin and the first biasing member 23 situated within the key unit mounting base for biasing the first locking pin 24 towards the unlocking position. Further, the first locking pin chamber 22 is adjacent the key system mounting base 21 and the first locking pin chamber 22 is positioned above the engaging leg 15b of the gear lever locking mechanism 15.

The inner sleeve 25 is configured substantially as an open-ended hollow cylindrical rod with a first locking pin pressing finger 26 extending horizontally therefrom about a lateral side of the inner sleeve 25. The first locking pin pressing finger 26 is situated within the key system mounting base 21 so as to extend through the open groove between the key system mounting base 21 and the first locking pin chamber 22. In operation, the first locking pin pressing finger 26 is configured to exert pressure, and specifically a downward directed force, on the first locking pin 24. In other words, the locking mechanism includes the inner sleeve 25 having the first locking pin pressing finger 26 extending from a lateral side of the inner sleeve 25 and the first locking pin pressing finger 26 directly engages the first locking pin 24 and the second locking pin 29 and the second biasing member 30 are horizontally mounted within the inner sleeve 25.

Figure 4:
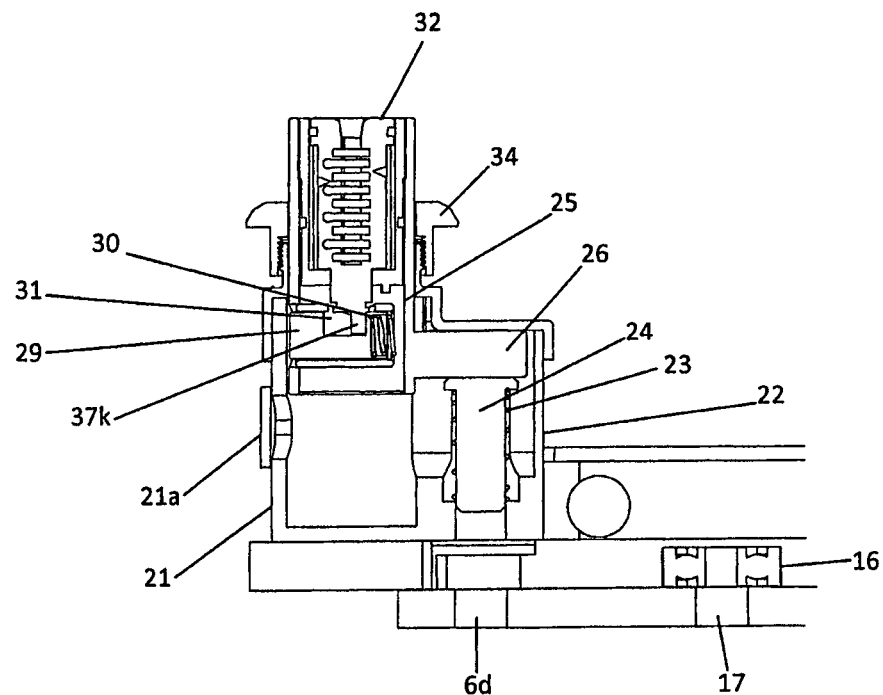
FIGS. 4-7 show a partial cross-sectional view of the gear lever locking device of FIG. 1 progressing from an unlocked state to a locked state.

About a lateral side of the inner sleeve 25 opposite the lateral side about which the first locking pin pressing finger 26 extends is an opening used in horizontally mounting a second locking pin chamber 27 thereto. An upper intermediate portion of the second locking pin chamber 27 is a through hole 28. Inside the second locking pin chamber 27 is provided with a second locking pin 29 mounted therein with a second spring rod 30 (i.e., a second biasing member) horizontally mounted about an innermost part thereof. That is, as best shown in FIG. 4, the second spring rod 30 is situated about a medial side of the second locking pin 29 so as to bias the second locking pin 29 in a lateral direction. The upper intermediate portion of the second locking pin 29 is provided with a locking pin shoulder 31 configured to align with through hole 28 of the second locking pin chamber 27 and to received an asymmetric cam rod 37k, as further discussed below.

The inner part of the inner sleeve 25 located above the second locking pin chamber 27 is provided with a key unit 32 mounted and housed within the inner sleeve 25 e.g., via a bolt. The key system mounting base 21, the first locking pin chamber 22, and the inner sleeve 25 is connected with or capped with a closure 33 about an upper outside portion thereof and secured thereto by a bolt. The closure 33 is a cylindrical rod of which an upper outside portion is provided with an external thread 33a to be tightened to an inner surface of a cap 34. The lateral side of the closure 33 is provided with a covering portion 33b that, in turn, will cover the first locking pin chamber 22 and be attached to the first locking pin chamber 22 e.g., via a bolt. The key unit 32 further includes a key 35 having a key code that is identical with a key code of the key unit 32. The key unit 32 is applicable to any other brake lock, clutch lock, etc. in a manner similar to the gear lever locking device of the present invention.

The key unit 32 is configured to move between a retracted position and an extended position within the key unit mounting base 21. Further, the first biasing member 23 biases the key unit to the extended position when the key unit 32 is in the second position. Furthermore, the second locking pin 29 is operatively connected to the key unit 32 and moveable between a locking position for locking the gear lever locking member in the locked position for inhibiting operational movement of the gear lever and an unlocking position for allowing pivotal movement of the gear lever locking member.

Figure 2:
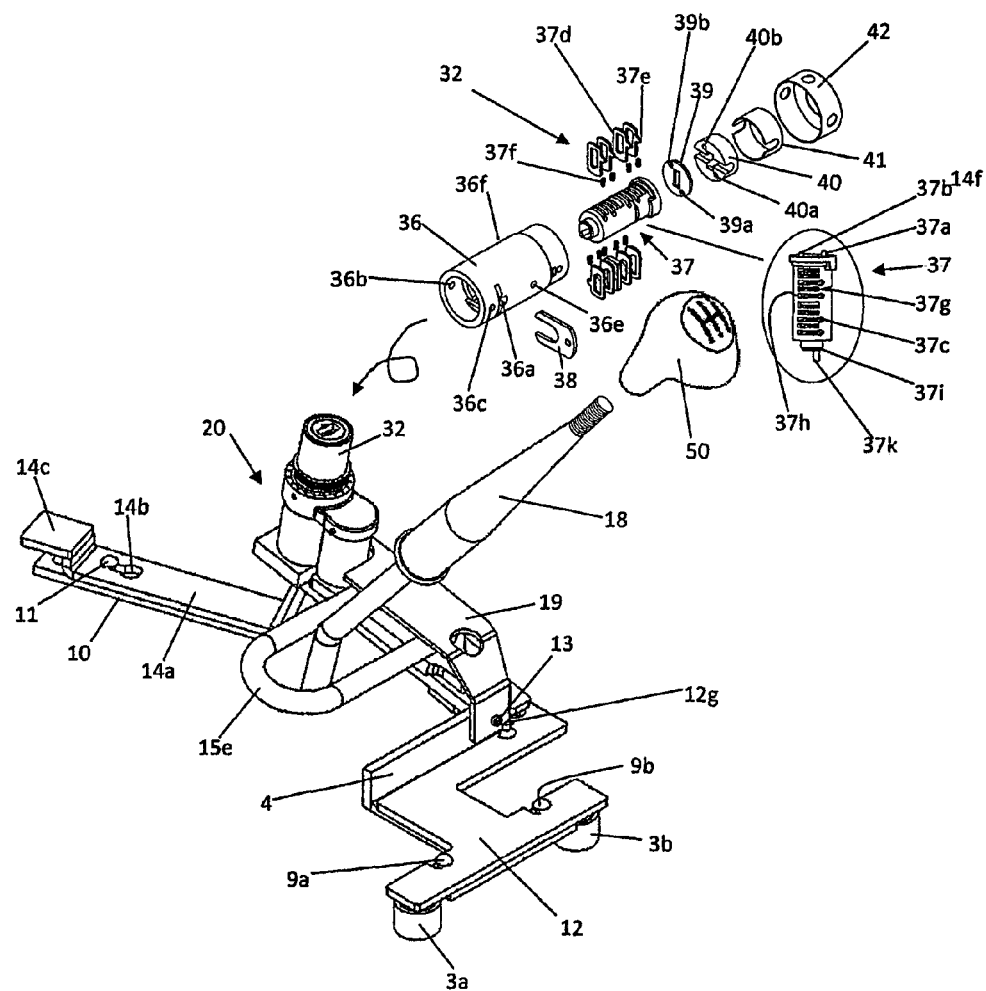
FIG. 2 shows a perspective view of the gear lever locking device of FIG. 1 and an exploded view of a key unit of the gear lever locking device of FIG. 1.
Figure 3:
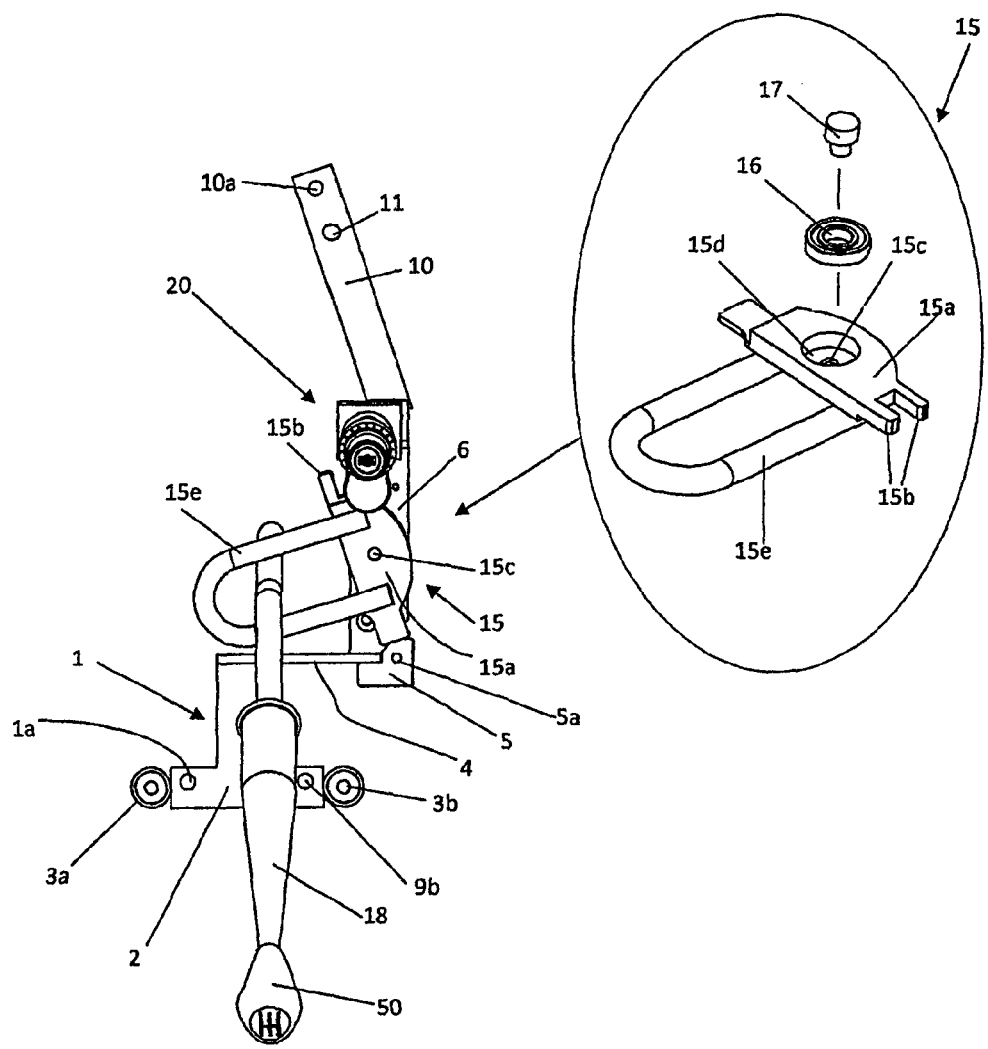
FIG. 3 shows a top view of the gear lever locking device of FIG. 1.

As can be clearly seen in FIG. 2, the key unit 32 includes a hollow cylindrical key case 36. About a lower lateral side of the key case 36 is a groove to which a locking plate 36a is mounted. Both lower lateral sides of the key case 36 are provided with a first fixing hole 36b and a second fixing hole 36c for use in the attachment of the key case 36 to the inner sleeve 25 e.g., by a bolt. Both upper lateral sides of the key case 36 are also provided with a third fixing hole 36e and a fourth fixing hole 36f.

A key core 37 is engaged with an inner core of the key case 36. The key core 37 is a cylindrical rod of which an upper end is provided with a first protrusion 37a and a second protrusion 37b. Both lateral sides along the length of the key core 37 are provided with a plurality of the key code wedge receiving grooves 37c. Each key code wedge 37d is configured as a quadrangular flat plate having an inner edge provided with a barb 37e extending inwardly. The inner part of each key code wedge receiving groove 37c is provided with a spring rod 37f (i.e., a biasing member) mounted thereto. The spring rod 37f serves to receive the barb 37e of each key code wedge 37d. Lateral sides located on different sides from the key code wedge receiving groove 37c are provided with a first recess 37g and a second recess 37h. A lower end of the key core 37 is provided with a locking shoulder 37i having an asymmetric cam rod 37k extending in a downward direction from the key core 37. The asymmetric cam rod 37k is inserted into the locking pin shoulder 31 of the second locking pin 29 for use in thrusting or moving the second locking pin 29 between a locking position and an unlocked position.

The key case 36 and the key core 37 are locked together by a locking plate 38 inserted into the groove used for mounting the locking plate 36a of the key case 36. The locking plate 38 is placed at or about the locking shoulder 37i of the key core 37 to lock the key core 37 in such a manner that the key core 37 will not be detached from the key case 36. In other words, the locking plate 38 locks the key core 37 in a fixed position within the key case 36.

The upper portion of the key core 37 is provided with a drill-proof plate 39 placed thereupon. Both lateral sides of the drill-proof plate 39 are provided with a first lateral groove 39a and a second lateral groove 39b in a position corresponding to a position with the first protrusion 37a and the second protrusion 37b of the key core 37. Once it is drilled by a drill with a load exceeding a predetermined acceptable limit of the first protrusion 37a and the second protrusion 37b, the first protrusion 37a and the second protrusion 37b detaches from the key core 37. Consequently, the drill-proof plate 39 is able to be turned independently. As a result, the key code wedge 37d of the key core 37 will not be damaged.

In sum, the key unit 32 includes the hollow cylindrical key case 36 attached to the inner sleeve 25 and the key core 37. The key core 37 is engaged with the key case 36. The key core 37 includes first and second protrusions 37a, 37b about an upper end of the key core, a plurality of key code wedge receiving grooves 37c, and the plurality of key code wedges 37d received with the plurality of key code wedge receiving grooves. Each key code wedge 37d is a quadrangular flat plate having an inner edge with the barb 37e extending inwardly. The key core further includes the spring rod 37f mounted to an inner part of each key code wedge receiving groove 37c for receiving the barb 37e of each key code wedge 37d, first and second recesses 37g, 37h, and the locking shoulder 37i about a lower end of the key core 37. The locking shoulder has an asymmetric cam rod 37k for insertion into the locking pin shoulder 31 of the second locking pin 29. The key case 36 and the key core 37 are locked together by the locking plate 38 positioned adjacent the locking shoulder 37i.

The drill-proof plate 39 is superposed by an anti-turning member 40. A lower surface of the anti-turning member 40 is provided with a first opening 40a and a second opening 40b to be placed over the first protrusion 37a and the second protrusion 37b of the key core 37. When tampered by punching, twisting or any other means with a load exceeding the predetermined limit of the anti-turning member 40, the anti-turning member 40 becomes independently rotatable and prevents the key core 37 from being turned and damaged. On the other hand, in case the drill-proof plate 39 is punched through and key code wedge 37d is damaged, if the damage of key core 37 is beyond the predetermined acceptable limit of the first recess 37g and the second recess 37h, the first recess 37g and the second recess 37h detaches from the key core 37. A tail end of the key core 37 and the remaining parts of the key code wedge 37d will thus be able to maintain their respective locking operations. As a result, the locking mechanism remains in its unlocking condition.

The upper part of the anti-turning member 40 is covered with a discharge screw 41 and the discharge screw 41 is covered with a key case cover 42 to prevent various damaged parts from being detached from the key unit 32.

When mounting the gear lever locking device of the present invention to a gear lever, the gear lever knob 50 is removed from the gear lever 18 and then the gear lever locking device is mounted thereon. That is, the gear lever locking device is installed and mounted to the existing gear console at predetermined positions as described above. Afterwards, the gear lever knob 50 is placed back on the gear lever 18.

FIG. 4 shows the gear lever locking device in accordance with the present invention in an unlocked position. The first spring rod 23 with the first locking pin 24 mounted inside provides an upward biasing force which acts upon the key unit 32 by providing an upward force on the first locking pin pressing finger 26 of the inner sleeve 25 which, in turn, provides an upward force on the key unit 32.

Figure 5:
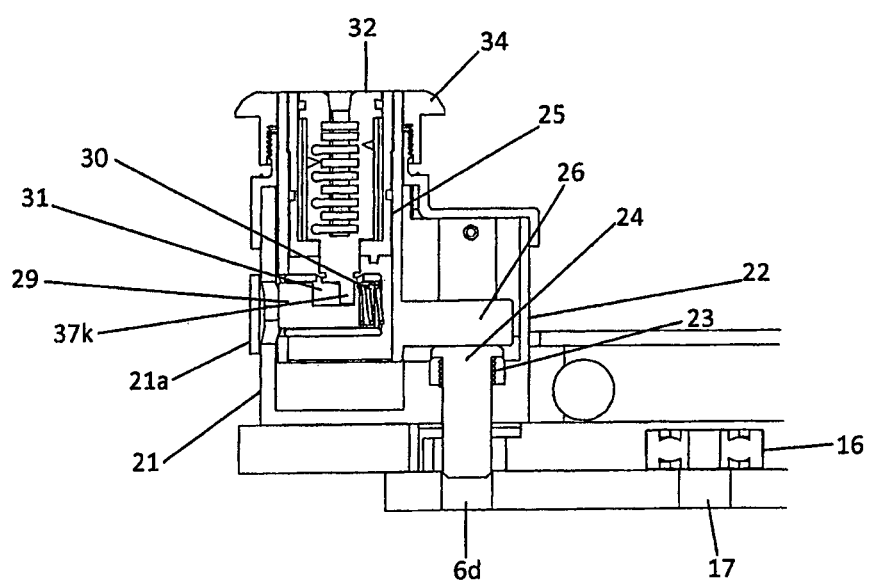

FIG. 5 illustrates a position of the first locking pin 24 and the key unit 32 when the key unit 32 is biased downward e.g., by a user. In this position, the gear lever locking device prevents any locking of the gear lever locking device even when the key unit is unintentionally pressed downward. In an unlocked states, as shown in FIG. 4, the asymmetric cam rod 37k of the key core 37 turn to the other side of the locking pin shoulder and bias the second locking pin 29 together with the spring 30 toward the inner most wall of the second locking pin chamber 27 which adjoining the first locking pin pressing finger 26. Therefore, even if there were pressure applied onto the key and subsequently cause the second locking pin 29 to align with the position of the opening 21a, the second locking pin 29 will not be able to engage with the opening 21a so as to lock. This is due to the fact that the first spring rod 23 with the first locking pin 24 mounted inside will bias the first locking pin pressing finger 26 of the inner sleeve 25 upwards. As a result, the key unit 32 will be pushed back upward once the downward biasing force is removed. As such, safety for the user who might unintentionally press the key unit 32 while driving or while the automobile is running is improved.

Figure 6:
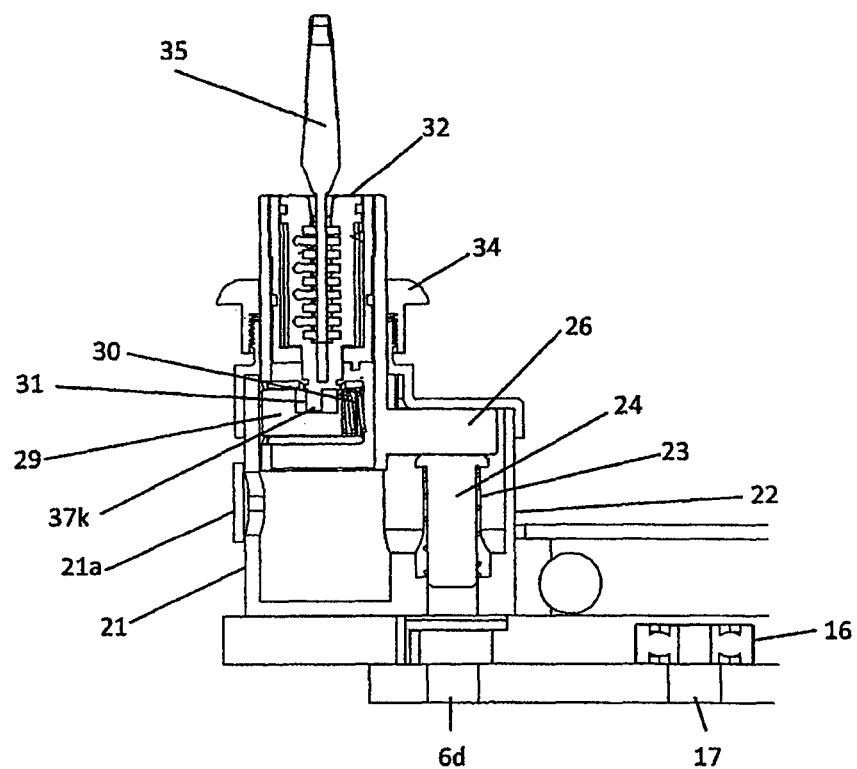

As shown in FIG. 6, in order to lock the gear lever locking device, a key 35 must first be inserted into the key unit 32 and turned to make the asymmetric cam rod 37k of the key core 37 turn to the other side of the locking pin shoulder 31 of the second locking pin 29. That is, as shown in FIG. 6, the key 35 must be turned to move the asymmetric cam rod 37k towards the lateral side. As a result, the second spring rod 30 can then bias the second locking pin 29 towards the lateral side i.e., a predetermined position for locking, as the second locking pin 29 is free from restraint as when the asymmetric cam rod 37k is positioned towards the medial side.

In other words, the second biasing member 30 biases the second locking pin 29 towards the locking position. Further, when the key unit 32 is in the first position, the second biasing member 30 biases the second locking pin to the locking position. In sum, the locking mechanism is configured to move the first and second locking pins 24, 29 to the locking positions when the key unit 32 is moved to the first position and the retracted position.

Figure 7:
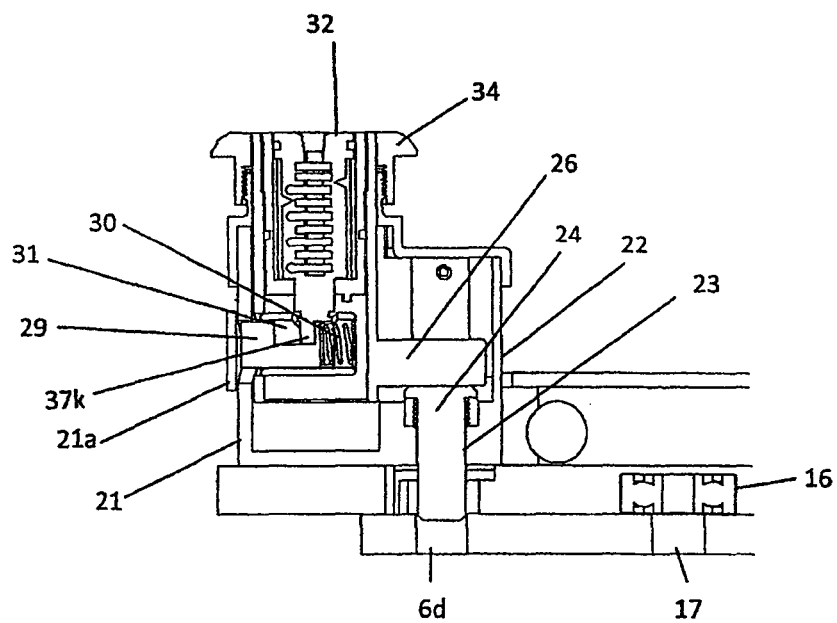

Thereafter, as shown in FIG. 7, the key unit 32 is pressed downward to allow the second locking pin 29 to align in position with the opening 21a. Then, as a result of the biasing force on the second locking pin 29 by the second spring rod 30 mounted horizontally about an innermost part, the second locking pin 29 is moved into the opening 21a. Meanwhile, the first locking pin pressing finger 26 of the inner sleeve 25 will press the first locking pin 24 into the locking position in the opening provided by the engaging leg 15b of the gear lever locking member 15 all the way to the locking pin slot 6d of the intermediate body 6 of the gear lever locking device mounting base 1. In this position, the gear lever locking device is in a locked position. In other words, the first locking pin engages the engaging leg to lock the gear lever locking member in the locked position.

In the locked position, the gear lever locking device will not allow a user to shift the gear lever 18 from e.g., the neutral position. Once the key 35 is turned to the unlock position, the asymmetric cam rod 37k of the key core 37 will push the second locking pin 29 out of the locking position from opening 21a while the first spring rod 23 biases the first locking pin 24 and the key unit 32 upward. As such, the first locking pin 24 will move out of the locking position for unlocking the gear lever locking device.

Figure 8:
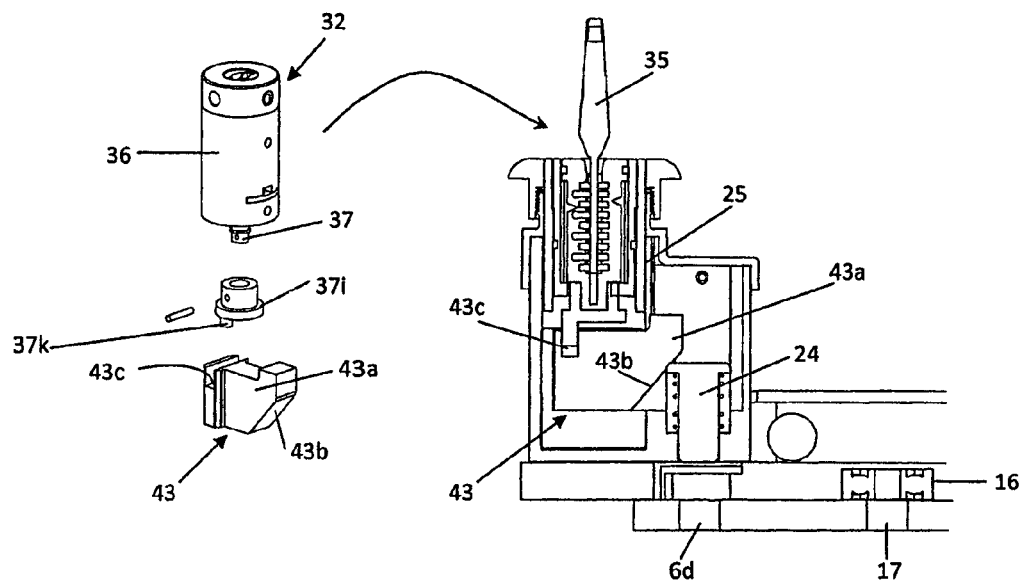
FIG. 8 shows a partial cross-sectional view of a gear lever locking device in accordance with another preferred embodiment in an unlocked position.

FIG. 8 shows a second embodiment of a gear lever locking device having a locking mechanism 20. The locking mechanism includes a locking pin driving member 43 that is used in combination with the inner sleeve 25 with the first locking pin pressing finger 26, the second locking pin chamber 27, the second locking pin 29, and the second spring rod 30 mounted horizontally at the innermost part as discussed above in the first embodiment.

The locking pin driving member 43 is configured as a quadrangular block that includes one lateral side having an upward ridge 43a. The upward ridge 43a has a bottom downwardly inclined surface 43b making an inward acute angle with respect to an upper curvature of the first locking pin 24 (or a horizontal) for use in driving the first locking pin 24 in a downward direction. The other lateral side of the quadrangular block of the locking pin driving member 43 includes a lock coupling groove 43c.

Figure 9:
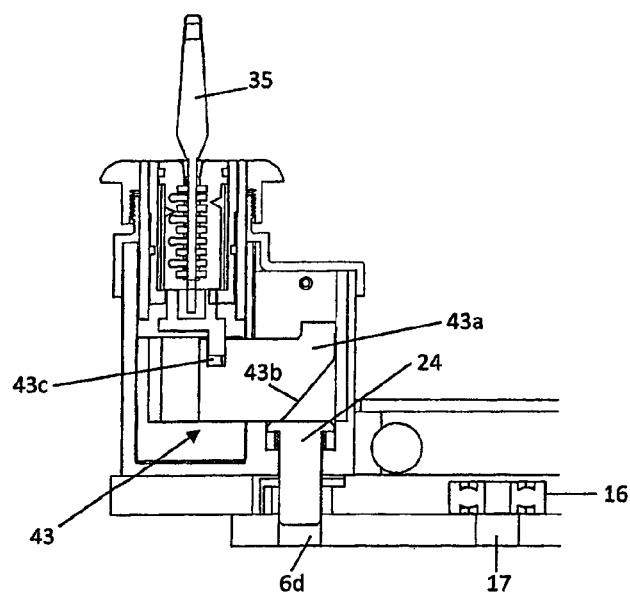
FIG. 9 shows a partial cross-sectional view of the gear lever locking device of FIG. 8 in a locked position.

Once a key 35 is inserted into the key unit 32 and turned to the unlocking position, the asymmetric cam rod 37k inserted in the lock coupling groove 43c pushes the locking pin driving member 43 to retreat from the locking position in the provided slot (i.e., in a lateral direction as shown in FIG. 9). Meanwhile, the first spring rod 23 with the first locking pin 24 mounted inside biases the first locking pin 24 upward and out of the position for the unlocking operation.

As shown in FIG. 9, in order to achieve the locking operation, the key 35 must be inserted into the key unit 32 and turned to make the asymmetric cam rod 37k of the key core 37 in the lock coupling groove 43c turn to the other side to move the locking pin driving member 43 inward. As the locking pin driving member 43 moves inward, it presses the first locking pin 24 into the locking position in the provided slot of the engaging leg 15b of the gear lever locking member 15 and the locking pin slot 6d of the intermediate body 6 of the gear lever locking device mounting base 1. In this position, the gear lever locking device will not allow the transmission to shift when the gear lever 18 is in the neutral position.

Figure 10:
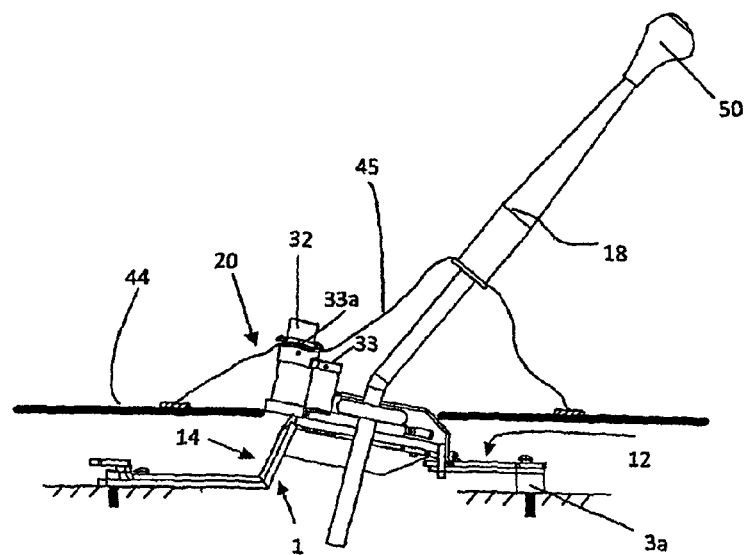
FIGS. 10-12 show the installation of the gear lever locking device of FIG. 1 to a gear lever console.
Figures 11, 12:
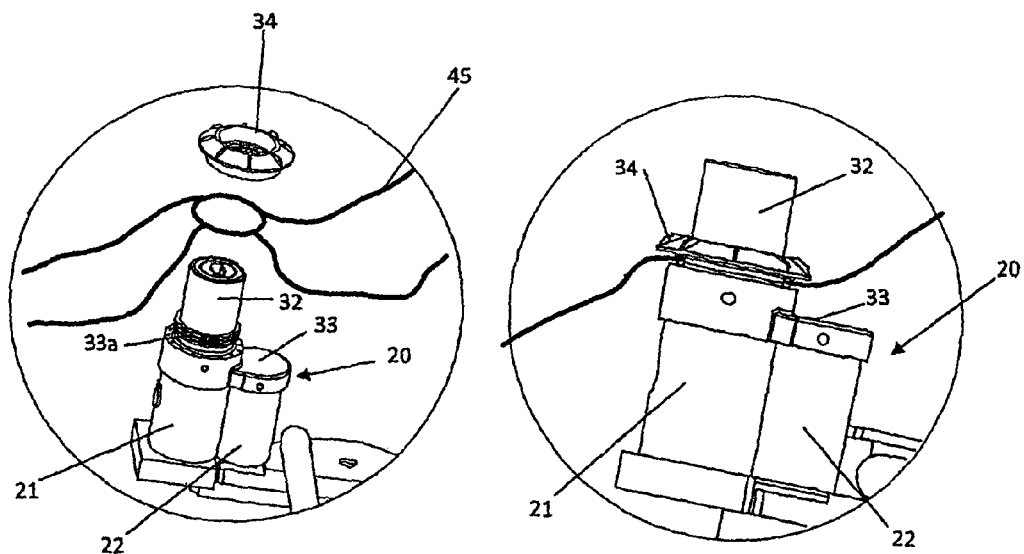

As shown in FIGS. 10 and 12, once the installation process of the gear lever locking device in accordance with the present invention is completed, the exit position of the key unit 32 exposes the upper portion of the gear lever console 44. That is, the key unit 32 protrudes at the gear lever covering fabric 45. Therefore, there is no need to punch through the gear lever console 44 depending on the make and the model of each automobile. The upper end of the closure 33 of the locking mechanism 20 is provided with an external thread 33a to support the washer to be tightened to lock the gear lever covering fabric 45 with the cap 34 of the locking mechanism 20 to prevent the gear lever covering fabric 45 from falling off.

Figure 13:
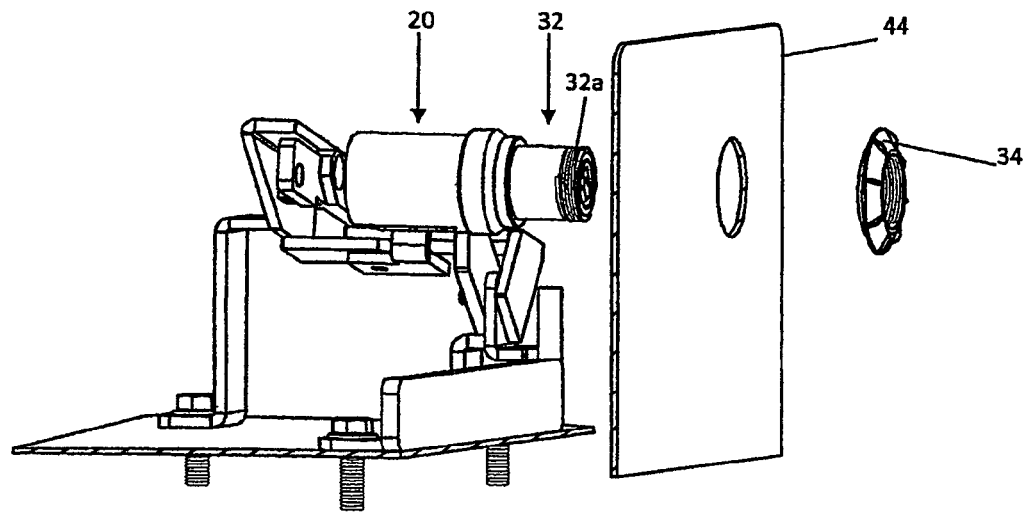
FIGS. 13 and 14 show another aspect of the installation of the gear lever locking device of FIG. 1.
Figure 14:
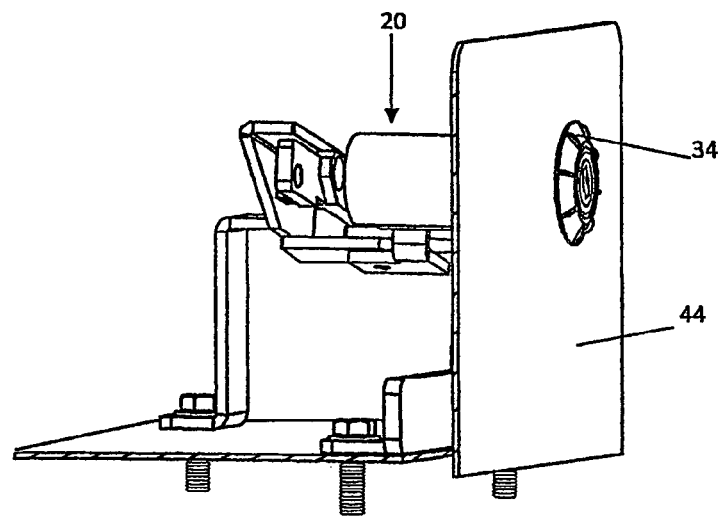
Figure 15:
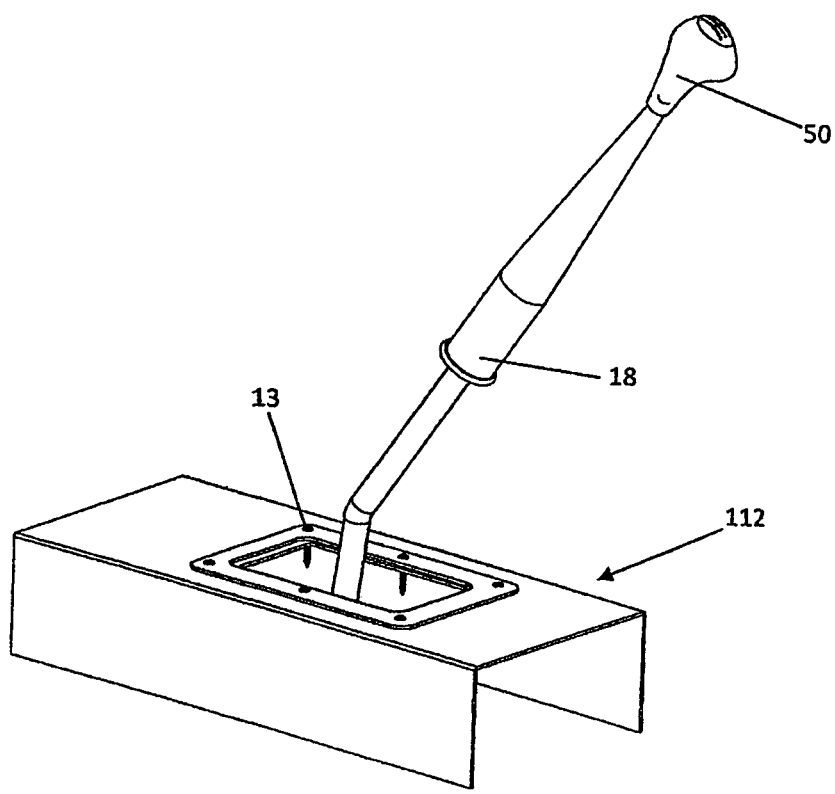
FIG. 15 shows a mounting plate of a gear lever locking device according to another aspect of the present invention.
Figure 16:
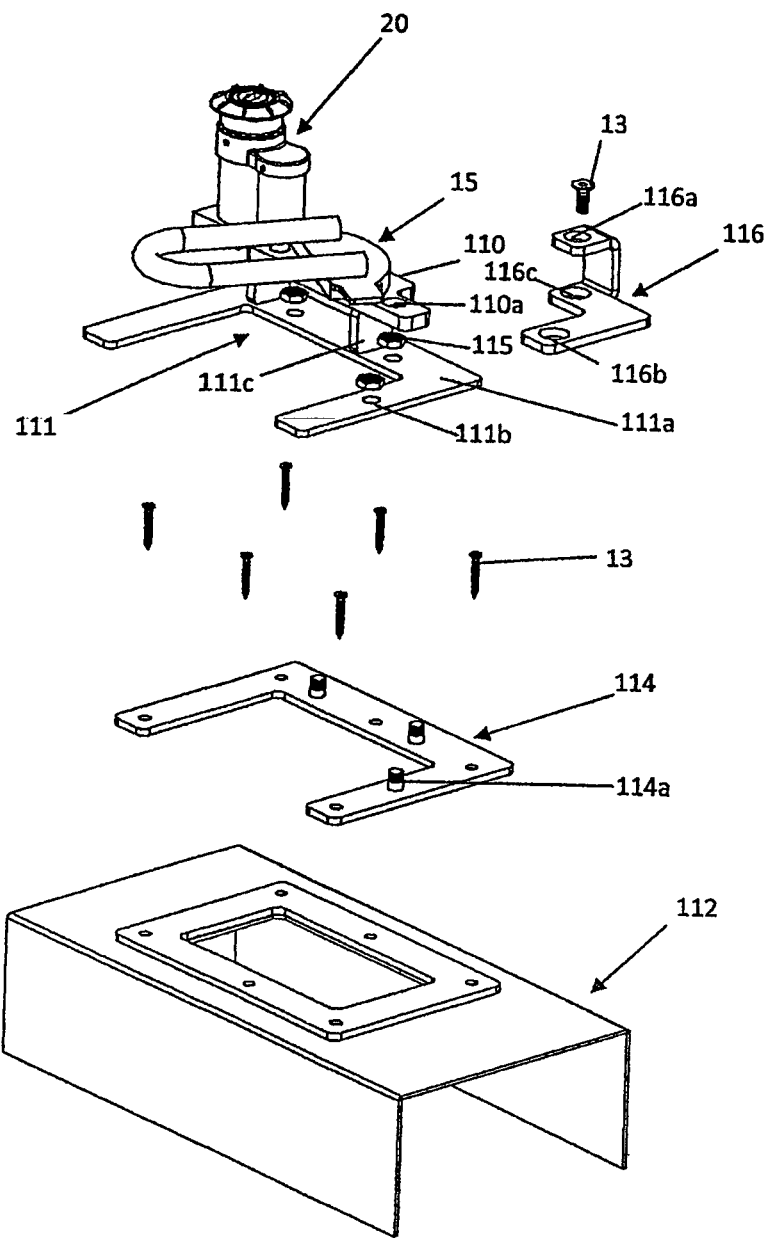
FIG. 16 shows an exploded view of another aspect of the gear lever locking device for mounting to the mounting plate of FIG. 15.
Figure 17:
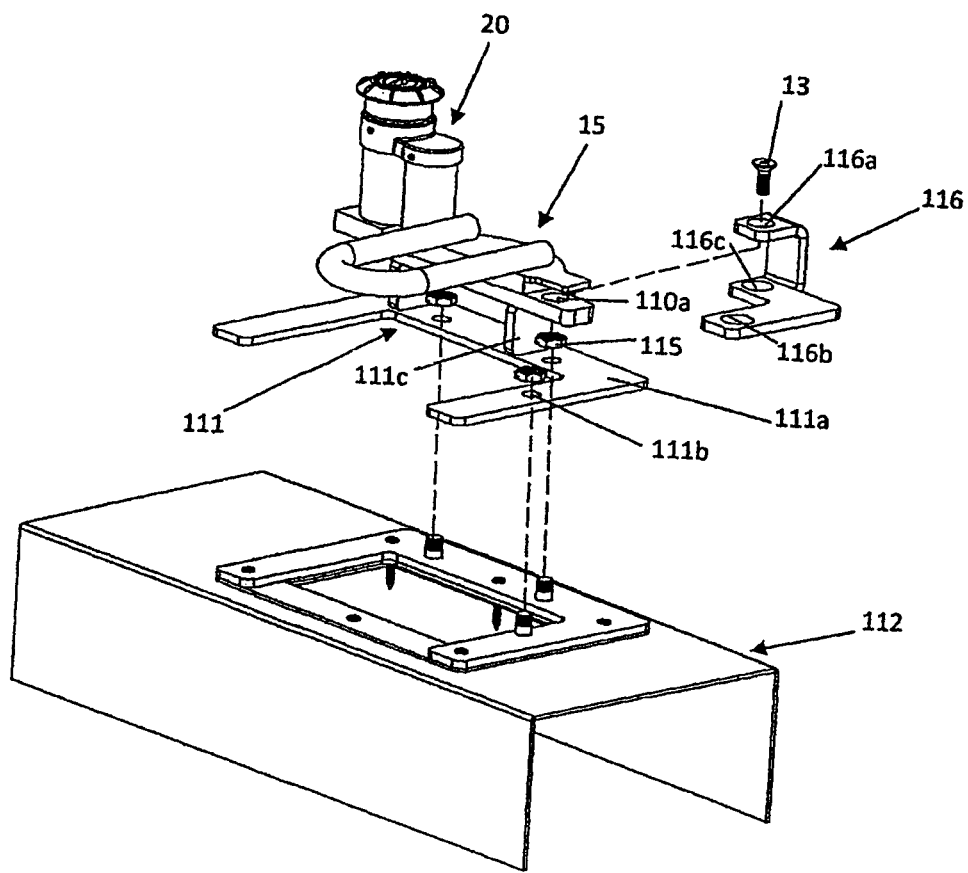
FIG. 17 shows another exploded view of the gear lever locking device of FIG. 16.
Figure 18:
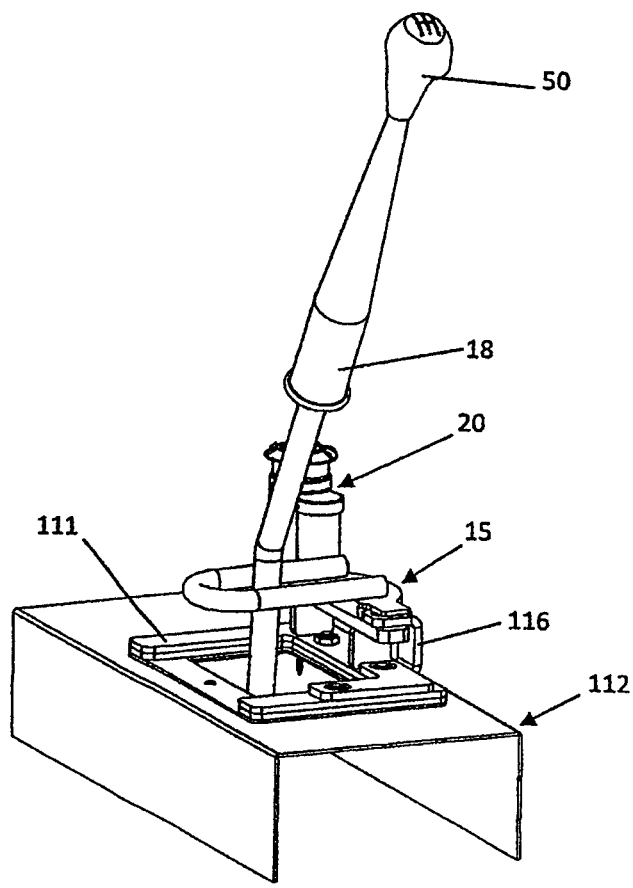
FIG. 18 shows a perspective view of the gear lever locking device of FIG. 16.

As shown in FIGS. 13 and 14, once the installation of the gear lever locking device in accordance with the present invention is completed, depending on the make and the model of each automobile, the exit position of the key unit 32 can alternatively be exposed at the lateral side of the gear lever console 44 where the gear lever console 44 needs to be punched to allow the key unit 32 to expose. The upper tube end of the key unit 32 of the locking mechanism 20 is provided with the external thread 32a to support the washer to be tightened to the cap 34 of the locking mechanism 20.

FIGS. 15 to 18 show another embodiment of the gear lever locking device in accordance with the present invention for use in case there are no existing room and features to facilitate installation of the gear lever locking member 15 and the locking mechanism 20. This is due to the fact that, in some models of an automobile, the original screw hole in the gear chamber is too small and thus lacks sufficient strength for sturdy installation of the gear lever locking member. Therefore, changes in the mounting base of the gear lever locking device are desirable to provide a sturdy installation of the gear lever locking device.

In another embodiment, the gear lever locking device in accordance with the present invention includes the gear lever locking member 15 and the locking mechanism 20 as described above. However, in this embodiment the gear lever locking device further comprising a reinforcing plate 114, whereby the gear lever locking device mounting base 111 is attached to the reinforcing plate 114 which, in turn, is attached to the base wall 112 of the original gear lever by a screw 13 at the existing screw hole of the automobile to improve the sturdiness of the installation. The upper portion of the reinforcing plate 114 is provided with a bolt 114a fixed in the predetermined position for use in the attachment to the gear lever locking device mounting base 111.

One lateral side above the reinforcing plate 114 is attached to the gear lever locking device mounting base 111. The gear lever locking device mounting base 111 includes a supporting base 111a of which size and shape corresponds to that of the reinforcing plate 114. The supporting base 111a is provided with a screw hole 111b in the corresponding position with a bolt 114a of the reinforcing plate 114 for use as the tightening portion with a nut 115.

The lateral side for use in attaching the supporting base 111a to the reinforcing plate 114 is provided with a supporting seat 111c elevated to the higher level than the supporting base 111a for use as the mounting and attaching portion of the gear lever locking member 15 and the locking mechanism 20. One lateral angle of the supporting base 110 is provided with a screw hole 110a to be attached to an additional screw cover 116 by a screw 13 inserted through a screw hole 116a to prevent the easy removal or damage of the gear lever locking device in accordance with the present invention in the locking position. The size and shape of the screw cover 116 corresponds to those of the supporting base 111a. to allow the appropriate covering of the hole 116b and 116c of the screw cover 116 at the screw hole 111b to prevent the removal of the nut 115.

On the basis of the aforementioned principle of the present invention, the objectives of the invention as set out above have been met. It will be appreciated by those skilled in the art that changes could be made to the preferred embodiments described above without departing from the broad inventive concept thereof. For example, additional components and steps can be added to the various vehicle security systems. Additionally, the principle of the present invention can also be applied with a gear lever locking device, brake/clutch locking device, a vehicle security locking system as described in PCT/TH2010/000046, and PCT/TH2013/000001 the same applicant/inventor. It is to be understood, therefore, that this invention is not limited to the particular embodiment disclosed, but it is intended to cover modifications within the spirit and scope of the present invention as defined by the appended claims.

I claim:

1. A gear lever locking device comprising:
    a gear lever locking device mounting base;
    a gear lever locking member (15) including:
        a base plate pivotally attached to the gear lever locking device mounting base, and
        a gear lever lock loop fixed to the base plate; and
    a locking mechanism (20) operatively connected to the gear lever locking member (15) that includes:
        a key unit (32) moveable between a first position for locking the locking mechanism and a second position for unlocking the locking mechanism, and
        a first locking pin (24) operatively connected to the key unit (32), wherein the first locking pin is moveable between a locking position for locking the gear lever locking member in a locked position for inhibiting operational movement of a gear lever and an unlocking position for allowing pivotal movement of the gear lever locking member in response to operational movement of a gear lever, and
        wherein when the key unit is moved to the first position, the first locking pin is moved to the locking position and when the key unit is moved to the second position, the first locking pin is moved to the unlocking position;
    wherein the gear lever locking device mounting base comprises:
        a vertical plate (4),
        a first lateral body (2) connected to the vertical plate (4),
        a vertically inclined plate (7), an intermediate body (6) connected to the vertical plate (4) and the vertically inclined plate (7), and
a second lateral body (10) connected to the vertically inclined plate (7); and
wherein the first lateral body (2) is connected to a lower end of the vertical plate (4), a first end of the intermediate body (6) is connected to an upper end of the vertical plate and a second end of the intermediate body opposite the first end is connected to an upper end of the vertically inclined plate (7) and the second lateral body (10) is connected to a lower end of the vertically inclined plate.

2. The gear lever locking device of claim 1, wherein
the base plate (15a) includes an engaging leg (15b) and a ball bearing pocket (15d) having a ball bearing (16) for pivotably mounting to the gear lever locking device mounting base; and
the gear lever lock loop (15e) is for circumscribing the gear lever.

3. The gear lever locking device of claim 2, wherein when in the locking position, the first locking pin (24) engages the engaging leg (15b) to lock the gear lever locking member in the locked position.

4. The gear lever locking device of claim 1, wherein the locking mechanism (20) further comprises:
a key system mounting base (21) for housing the key unit (32) and the first locking pin (24); and
a first biasing member (23) situated within the key unit mounting base for biasing the first locking pin (24) towards the unlocking position.

5. The gear lever locking device of claim 4, wherein the key unit (32) is configured to move between a retracted position and an extended position within the key unit mounting base (21), and wherein the first biasing member (23) biases the key unit to the extended position when the key unit is in the second position.

6. The gear lever locking device of claim 5, wherein the locking mechanism (20) further comprises a second locking pin (29) operatively connected to the key unit (32), and wherein the second locking pin (29) is moveable between a locking position for locking the gear lever locking member in the locked position for inhibiting operational movement of a gear lever and an unlocking position for allowing pivotal movement of the gear lever locking member.

7. The gear lever locking device of claim 6, wherein the locking mechanism (20) further comprises a second biasing member (30) that biases the second locking pin (29) towards the locking position.

8. The gear lever locking device of claim 7, wherein when the key unit (32) is in the first position and the second biasing member (30) biases the second locking pin to the locking position.

9. The gear lever locking device of claim 8, wherein the locking mechanism (20) is configured to move the first and second locking pins (24, 29) to the locking positions when the key unit (32) is moved to the first position and the retracted position.

10. The gear lever locking device of claim 4, wherein the locking mechanism (20) further comprises a first locking pin chamber (22) adjacent the key system mounting base (21), and wherein the first locking pin chamber (22) is positioned above the engaging leg (15b) of the gear lever locking member (15).

11. The gear lever locking device of claim 1, wherein the first lateral body (2) includes:
one lateral portion having first and second sides (2a, 2b) extending therefrom;

a first screw holding base (3a) adjacent the first side (2a) for attaching to a base frame of a gear lever console of the gear lever; and
a second screw holding base (3b) adjacent the second side (2b) for attaching to the base frame of the gear lever console of the gear lever.

12. The gear lever locking device of claim 1, wherein the intermediate body (6) includes a first screw hole (6a), a second screw hole (6b), a third screw hole (6c) and a locking pin slot (6d) about a lateral side of the intermediate body (6).

13. The gear lever locking device of claim 1, wherein the gear lever locking device further comprises a first screw cover plate (19) having a fixing portion (19a) for attaching to the intermediate body (6) and a screw hole (19c) for attaching to the vertical plate (4).

14. The gear lever locking device of claim 1, wherein the gear lever locking device further comprises a second screw cover plate (12) having a size and shape to correspond to the first lateral body (2) and a bending portion (12d) extending to cover a landing plate (5) about a lower end of the vertical plate (4).

15. The gear lever locking device of claim 1, wherein the gear lever locking device further comprises a third screw cover (14) having a size and shape substantially corresponding to the second lateral body (10) and the vertically inclined plate (7) and an abutting member (14e) for abutting adjacent the intermediate body (6).

16. The gear lever locking device of claim 1, wherein the locking mechanism (20) further comprises an inner sleeve (25) having a first locking pin pressing finger (26) extending from a lateral side of the inner sleeve (25), and wherein the first locking pin pressing finger (26) directly engages the first locking pin (24), and the second locking pin (29) and the second biasing member (30) are horizontally mounted within the inner sleeve.

17. The gear lever locking device of claim 16, wherein the key unit (32) comprises:
a hollow cylindrical key case (36) attached to the inner sleeve (25); and
a key core (37) engaged with the key case (36), wherein the key core (37) includes:
first and second protrusions (37a, 37b) about an upper end of the key core,
a plurality of key code wedge receiving grooves (37c),
a plurality of key code wedges (37d) received with the plurality of key code wedge receiving grooves, wherein each key code wedge (37d) is a quadrangular flat plate having an inner edge with a barb (37e) extending inwardly,
a spring rod (37f) mounted to an inner part of each key code wedge receiving groove (37c) for receiving the barb (37e) of each key code wedge (37d),
first and second recesses (37g, 37h), and
a locking shoulder (37i) about a lower end of the key core (37), the locking shoulder having an asymmetric cam rod (37k) for insertion into a locking pin shoulder (31) of the second locking pin (29).

18. The gear lever locking device of claim 17, wherein the key case (36) and the key core (37) are locked together by a locking plate (38) positioned adjacent the locking shoulder (37i).

19. The gear lever locking device of claim 17, wherein the locking mechanism (20) further comprises a drill-proof plate (39) mounted to the key core for covering an upper portion of the key core (37) and configured to independently rotate with respect to the key core.

20. A gear lever locking device comprising:
a gear lever locking device mounting base;
a gear lever locking member (15) including:
  a base plate pivotally attached to the gear lever locking device mounting base, and
  a gear lever lock loop fixed to the base plate; and
a locking mechanism (20) operatively connected to the gear lever locking member (15) that includes:
  a key unit (32) moveable between a first position for locking the locking mechanism and a second position for unlocking the locking mechanism, the key unit including:
    a plurality of key code wedge receiving grooves (37*c*),
    a plurality of key code wedges (37*d*) received with the plurality of key code wedge receiving grooves,
  a first locking pin (24) operatively connected to the key unit (32), wherein the first locking pin is moveable between a locking position for locking the gear lever locking member in a locked position for inhibiting operational movement of a gear lever and an unlocking position for allowing pivotal movement of the gear lever locking member in response to operational movement of a gear lever, and
  a locking pin driving member (43) configured as a quadrangular block having an inclined surface (43*b*) with an acute angle with respect to a horizontal,
wherein when the key unit (32) is moved to the first position, the locking pin driving member (43) slidingly engages the first locking pin to move the first locking pin to the locking position and when the key unit is moved to the second position, the first locking pin is biased to the unlocking position by a first biasing member (30).

21. The gear lever locking device of claim 20, wherein the gear lever locking device mounting base is mounted to a reinforcing plate (114) attached to a base wall (112) of the gear lever.

22. The gear lever locking device of claim 21, wherein the gear lever locking device mounting base includes a supporting base (111*a*) configured to have a size and shape corresponding to the reinforcing plate (114).

23. The gear lever locking device of claim 20, wherein each of the plurality of key code wedges (37*d*) is a quadrangular flat plate having a barb (37*e*).

\* \* \* \* \*